(12) United States Patent
Boudreault et al.

(10) Patent No.: US 8,597,600 B2
(45) Date of Patent: *Dec. 3, 2013

(54) PROCESSES FOR EXTRACTING ALUMINUM FROM ALUMINOUS ORES

(71) Applicant: Orbite Aluminae Inc., St-Laurent (CA)

(72) Inventors: Richard Boudreault, St-Laurent (CA); Serge Alex, Québec (CA); Fabienne Biasotto, Outremont (CA)

(73) Assignee: Orbite Aluminae Inc., St-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,703

(22) Filed: Oct. 29, 2012

(65) Prior Publication Data

US 2013/0052103 A1 Feb. 28, 2013

Related U.S. Application Data

(63) Continuation of application No. 13/471,901, filed on May 15, 2012, now Pat. No. 8,337,789, which is a continuation of application No. 12/900,371, filed on Oct. 7, 2010, now Pat. No. 8,241,594, which is a continuation of application No. 12/601,079, filed as application No. PCT/CA2008/000877 on May 7, 2008, now Pat. No. 7,837,961.

(60) Provisional application No. 60/939,254, filed on May 21, 2007.

(51) Int. Cl.
*C01G 23/00* (2006.01)

(52) U.S. Cl.
USPC ........... 423/132; 423/112; 423/122; 423/140; 423/625

(58) Field of Classification Search
USPC .......... 423/112, 122, 127, 132, 139–146, 625
See application file for complete search history.

(56) References Cited

U.S. PATENT DOCUMENTS

| | | | |
|---|---|---|---|
| 558,726 | A | 4/1896 | Gooch |
| 650,763 | A | 5/1900 | Raynaud |

(Continued)

FOREIGN PATENT DOCUMENTS

| | | |
|---|---|---|
| AU | 631226 | 2/1991 |
| CA | 1066872 | 11/1979 |

(Continued)

OTHER PUBLICATIONS

An English translation of Zhang et al., "Research on the Kinetics of Alumina from Kaolinite Leaching in Sulphuric Acid", Journal of Hefei University of Technology, vol. 24, No. 1, Feb. 2001, pp. 71-74.

(Continued)

*Primary Examiner* — Steven Bos
(74) *Attorney, Agent, or Firm* — Bereskin & Parr LLP/S.E.N.C.R.L., s.r.l.

(57) ABSTRACT

There are provided processes for extracting aluminum ions from aluminous ores and for preparing alumina. Such processes can be used with various types of aluminous ores such as aluminous ores comprising, for example, various types of metals such as Fe, K, Mg, Na, Ca, Mn, Ba, Zn, Li, Sr, V, Ni, Cr, Pb, Cu, Co, Sb, As, B, Sn, Be, Mo, or mixtures thereof.

8 Claims, 1 Drawing Sheet

(56) References Cited

U.S. PATENT DOCUMENTS

| | | | |
|---|---|---|---|
| 1,494,029 A | 5/1924 | Scofield et al. | |
| 1,519,880 A | 12/1924 | Heinrich et al. | |
| 1,701,510 A | 2/1929 | Sieurin | |
| 1,778,083 A | 10/1930 | Marburg | |
| 1,931,515 A | 10/1933 | Fritz et al. | |
| 1,956,139 A | 4/1934 | Staufer et al. | |
| 1,962,498 A | 6/1934 | Frost | |
| 1,999,773 A | 4/1935 | McMichael | |
| 2,189,376 A | 2/1940 | Burman | |
| 2,354,133 A | 7/1944 | Lyons | |
| 2,376,696 A * | 5/1945 | Hixson et al. | 423/132 |
| 2,406,577 A | 8/1946 | Alessandroni | |
| 2,489,309 A | 11/1949 | Mills et al. | |
| 2,648,595 A | 8/1953 | Kennedy | |
| 2,707,149 A | 4/1955 | McKinley | |
| 2,722,471 A | 11/1955 | Hirsch et al. | |
| 2,769,686 A | 11/1956 | McCullough et al. | |
| 2,815,264 A | 12/1957 | Calkins et al. | |
| 2,824,783 A | 2/1958 | Peppard et al. | |
| 2,914,381 A | 11/1959 | Wainer | |
| 2,914,464 A | 11/1959 | Burton et al. | |
| 3,013,859 A | 12/1961 | Kuhlman, Jr. et al. | |
| 3,104,950 A | 9/1963 | Ellis | |
| 3,159,452 A | 12/1964 | Lerner | |
| 3,211,521 A | 10/1965 | George et al. | |
| 3,446,578 A * | 5/1969 | Sullivan | 423/127 |
| 3,473,919 A | 10/1969 | Metcalfe et al. | |
| 3,479,136 A | 11/1969 | Michener, Jr. et al. | |
| 3,540,860 A | 11/1970 | Cochran | |
| 3,545,920 A | 12/1970 | George et al. | |
| 3,586,477 A | 6/1971 | Flood | |
| 3,620,671 A | 11/1971 | Maurel et al. | |
| 3,704,113 A * | 11/1972 | Hildreth | 423/136 |
| 3,751,553 A | 8/1973 | Oslo et al. | |
| 3,816,605 A * | 6/1974 | Belsky | 423/626 |
| 3,852,430 A | 12/1974 | Lienau et al. | |
| 3,862,293 A | 1/1975 | Maurel et al. | |
| 3,903,239 A | 9/1975 | Berkovich | |
| 3,922,164 A | 11/1975 | Reid et al. | |
| 3,946,103 A | 3/1976 | Hund | |
| 3,966,909 A | 6/1976 | Grunig et al. | |
| 1,983,212 A | 9/1976 | Lowenstein et al. | |
| 3,983,212 A | 9/1976 | Lowenstein et al. | |
| 4,069,296 A | 1/1978 | Huang | |
| 4,098,868 A | 7/1978 | Tolley | |
| 4,107,281 A | 8/1978 | Reh et al. | |
| 4,110,399 A | 8/1978 | Gaudemack et al. | |
| 4,124,680 A | 11/1978 | Cohen et al. | |
| 4,130,627 A | 12/1978 | Russ et al. | |
| 4,133,677 A | 1/1979 | Matsui et al. | |
| 4,172,879 A | 10/1979 | Miller et al. | |
| 4,177,242 A | 12/1979 | Cohen et al. | |
| 4,193,968 A | 3/1980 | Sullivan et al. | |
| 4,198,231 A | 4/1980 | Gusset | |
| 4,222,989 A | 9/1980 | Belsky et al. | |
| 4,224,287 A | 9/1980 | Ziegenbalg et al. | |
| 4,237,102 A | 12/1980 | Cohen et al. | |
| 4,239,735 A | 12/1980 | Eisele et al. | |
| 4,241,030 A | 12/1980 | Cohen et al. | |
| 4,297,326 A | 10/1981 | Gjelsvik et al. | |
| 4,318,896 A | 3/1982 | Schoonover | |
| 4,362,703 A | 12/1982 | Boybay et al. | |
| 4,378,275 A | 3/1983 | Adamson et al. | |
| 4,392,987 A | 7/1983 | Laine et al. | |
| 4,414,196 A | 11/1983 | Matsumoto et al. | |
| 4,437,994 A | 3/1984 | Baker | |
| 4,490,338 A | 12/1984 | De Schepper et al. | |
| 4,530,819 A | 7/1985 | Czeglédi et al. | |
| 4,560,541 A | 12/1985 | Davis | |
| 4,567,026 A | 1/1986 | Lisowyj | |
| 4,634,581 A | 1/1987 | Cambridge et al. | |
| 4,652,433 A | 3/1987 | Ashworth et al. | |
| 4,676,838 A | 6/1987 | Franz et al. | |
| 4,741,831 A | 5/1988 | Grinstead | |
| 4,797,271 A | 1/1989 | Fleming et al. | |
| 4,816,233 A | 3/1989 | Rourke et al. | |
| 4,820,498 A | 4/1989 | Newkirk | |
| 4,826,671 A | 5/1989 | Arndt et al. | |
| 4,898,719 A | 2/1990 | Rourke et al. | |
| 4,913,884 A | 4/1990 | Feuling | |
| 4,938,871 A | 7/1990 | Musikas et al. | |
| 4,965,053 A | 10/1990 | Herchenroeder et al. | |
| 4,968,504 A | 11/1990 | Rourke et al. | |
| 4,980,141 A | 12/1990 | Kimura et al. | |
| 4,988,487 A | 1/1991 | Lai et al. | |
| 4,995,984 A | 2/1991 | Barkatt et al. | |
| 5,006,753 A | 4/1991 | Hasker et al. | |
| 5,011,665 A | 4/1991 | Cailly et al. | |
| 5,015,447 A | 5/1991 | Fulford et al. | |
| 5,019,362 A | 5/1991 | Rourke et al. | |
| 5,030,424 A | 7/1991 | Fulford et al. | |
| 5,035,365 A | 7/1991 | Birmingham | |
| 5,037,608 A | 8/1991 | Tarcy et al. | |
| 5,045,209 A | 9/1991 | Snyder et al. | |
| 5,071,472 A | 12/1991 | Traut et al. | |
| 5,093,091 A | 3/1992 | Dauplaise et al. | |
| 5,112,534 A | 5/1992 | Guon et al. | |
| 5,124,008 A | 6/1992 | Rendall et al. | |
| 5,160,482 A | 11/1992 | Ash et al. | |
| 5,180,563 A | 1/1993 | Lai et al. | |
| 5,188,809 A | 2/1993 | Crocker et al. | |
| 5,192,443 A | 3/1993 | Delloye et al. | |
| 5,244,649 A | 9/1993 | Ostertag et al. | |
| 5,274,129 A | 12/1993 | Natale et al. | |
| 5,368,736 A | 11/1994 | Horwitz et al. | |
| 5,409,677 A | 4/1995 | Zinn | |
| 5,409,678 A | 4/1995 | Smith et al. | |
| 5,433,931 A | 7/1995 | Bosserman | |
| 5,443,618 A | 8/1995 | Chapman | |
| 5,492,680 A | 2/1996 | Odekirk | |
| 5,500,043 A | 3/1996 | Harada et al. | |
| 5,505,857 A | 4/1996 | Misra et al. | |
| 5,512,256 A | 4/1996 | Bray et al. | |
| 5,531,970 A | 7/1996 | Carlson | |
| 5,585,080 A | 12/1996 | Andersen et al. | |
| 5,597,529 A | 1/1997 | Tack | |
| 5,622,679 A | 4/1997 | Yuan et al. | |
| 5,632,963 A | 5/1997 | Schwab et al. | |
| 5,639,433 A | 6/1997 | Yuan et al. | |
| 5,645,652 A | 7/1997 | Okinaka et al. | |
| 5,665,244 A | 9/1997 | Rothenberg et al. | |
| 5,720,882 A | 2/1998 | Stendahl et al. | |
| 5,723,097 A | 3/1998 | Barnett et al. | |
| 5,766,478 A | 6/1998 | Smith et al. | |
| 5,787,332 A | 7/1998 | Black et al. | |
| 5,792,330 A | 8/1998 | Petersen et al. | |
| 5,795,482 A | 8/1998 | Ehle et al. | |
| 5,876,584 A | 3/1999 | Cortellini | |
| 5,904,856 A | 5/1999 | Kvant et al. | |
| 5,922,403 A | 7/1999 | Tecle | |
| 5,942,199 A | 8/1999 | Jokinen et al. | |
| 5,955,042 A | 9/1999 | Barnett et al. | |
| 5,962,125 A | 10/1999 | Masaki | |
| 5,993,758 A | 11/1999 | Nehari et al. | |
| 5,997,828 A | 12/1999 | Rendall | |
| 6,045,631 A | 4/2000 | Tarcy et al. | |
| 6,077,486 A | 6/2000 | Spitzer | |
| 6,093,376 A | 7/2000 | Moore | |
| 6,153,157 A | 11/2000 | McLaughlin | |
| 6,221,233 B1 | 4/2001 | Rendall | |
| 6,238,566 B1 | 5/2001 | Yoshida et al. | |
| 6,248,302 B1 | 6/2001 | Barnett et al. | |
| 6,254,782 B1 | 7/2001 | Kreisler | |
| 6,267,936 B1 | 7/2001 | Delmas et al. | |
| 6,309,441 B1 | 10/2001 | Benz et al. | |
| 6,312,653 B1 | 11/2001 | Delmau et al. | |
| 6,337,061 B1 | 1/2002 | Iyatomi et al. | |
| 6,348,154 B1 | 2/2002 | Stewart | |
| 6,383,255 B1 | 5/2002 | Sundkvist | |
| 6,395,062 B2 | 5/2002 | Olafson et al. | |
| 6,395,242 B1 | 5/2002 | Allen et al. | |
| 6,406,676 B1 | 6/2002 | Sundkvist | |
| 6,447,738 B1 | 9/2002 | Rendall et al. | |
| 6,468,483 B2 | 10/2002 | Barnett et al. | |

(56) References Cited

U.S. PATENT DOCUMENTS

| | | | |
|---|---|---|---|
| 6,500,396 | B1 | 12/2002 | Lakshmanan et al. |
| 6,565,733 | B1 | 5/2003 | Sportel et al. |
| 6,576,204 | B2 | 6/2003 | Johansen |
| 6,716,353 | B1 | 4/2004 | Mirzadeh et al. |
| 6,843,970 | B1 | 1/2005 | Hard |
| 6,893,474 | B2 | 5/2005 | Jäfverström et al. |
| 7,090,809 | B2 | 8/2006 | Harel et al. |
| 7,118,719 | B2 | 10/2006 | Fugleberg |
| 7,220,394 | B2 | 5/2007 | Sreeram et al. |
| 7,282,187 | B1 | 10/2007 | Brown et al. |
| 7,294,319 | B2 | 11/2007 | Lahtinen et al. |
| 7,381,690 | B1 | 6/2008 | Ding et al. |
| 7,498,005 | B2 | 3/2009 | Yadav |
| 7,651,676 | B2 | 1/2010 | Beaulieu et al. |
| 7,781,365 | B2 | 8/2010 | Okamoto |
| 7,837,961 | B2 | 11/2010 | Boudreault et al. |
| 7,892,426 | B2 | 2/2011 | Hayashi et al. |
| 7,906,097 | B2 | 3/2011 | Beaulieu et al. |
| 8,038,969 | B2 | 10/2011 | Kondo et al. |
| 8,216,532 | B1 | 7/2012 | Vierheilig |
| 8,241,594 | B2 | 8/2012 | Boudreault et al. |
| 8,287,826 | B2 | 10/2012 | Pettey |
| 8,337,789 | B2 | 12/2012 | Boudreault et al. |
| 2002/0050230 | A1 | 5/2002 | Meisen |
| 2002/0071802 | A1 | 6/2002 | Fulton et al. |
| 2003/0075021 | A1 | 4/2003 | Young et al. |
| 2003/0152502 | A1 | 8/2003 | Lewis et al. |
| 2003/0183043 | A1 | 10/2003 | Wai et al. |
| 2004/0042945 | A1 | 3/2004 | Rao et al. |
| 2004/0062695 | A1 | 4/2004 | Horwitz et al. |
| 2005/0166706 | A1 | 8/2005 | Withers et al. |
| 2006/0018813 | A1 | 1/2006 | Bray |
| 2006/0066998 | A1 | 3/2006 | Ishiguro |
| 2007/0062669 | A1 | 3/2007 | Song et al. |
| 2007/0278106 | A1 | 12/2007 | Shaw |
| 2008/0047395 | A1 | 2/2008 | Liu et al. |
| 2008/0069748 | A1 | 3/2008 | Lien et al. |
| 2008/0115627 | A1 | 5/2008 | Wang et al. |
| 2008/0286182 | A1 | 11/2008 | Costa et al. |
| 2009/0241731 | A1 | 10/2009 | Pereira et al. |
| 2009/0272230 | A1 | 11/2009 | Mackowski et al. |
| 2010/0018347 | A1 | 1/2010 | Holden et al. |
| 2010/0078382 | A1 | 4/2010 | Naganawa et al. |
| 2010/0129277 | A1 | 5/2010 | Kondo et al. |
| 2010/0160144 | A1 | 6/2010 | Kim et al. |
| 2010/0260640 | A1 | 10/2010 | Shindo et al. |
| 2010/0278720 | A1 | 11/2010 | Wong et al. |
| 2010/0319491 | A1 | 12/2010 | Sugahara et al. |
| 2010/0329970 | A1 | 12/2010 | Lian et al. |
| 2011/0017020 | A1 | 1/2011 | Homma et al. |
| 2011/0044869 | A1 | 2/2011 | Boudreault et al. |
| 2011/0120267 | A1 | 5/2011 | Roche |
| 2011/0182786 | A1 | 7/2011 | Burba, III |
| 2012/0073407 | A1 | 3/2012 | Drinkard, Jr. et al. |
| 2012/0237418 | A1 | 9/2012 | Boudreault et al. |

FOREIGN PATENT DOCUMENTS

| | | |
|---|---|---|
| CA | 1136380 | 11/1982 |
| CA | 1176470 | 10/1984 |
| CA | 2027973 | 4/1991 |
| CA | 2029623 | 5/1991 |
| CA | 2036058 | 8/1991 |
| CA | 2097809 | 7/1992 |
| CA | 2122364 | 2/1994 |
| CA | 2156295 | 9/1994 |
| CA | 2160488 | 11/1994 |
| CA | 2193726 | 1/1996 |
| CA | 2159534 | 4/1996 |
| CA | 2167890 | 7/1996 |
| CA | 2240067 | 6/1997 |
| CA | 2251433 | 4/1999 |
| CA | 2360447 | 8/2000 |
| CA | 2306015 | 12/2000 |
| CA | 2309225 | 12/2000 |
| CA | 2377600 | 1/2001 |
| CA | 2317692 | 3/2001 |
| CA | 2391394 | 5/2001 |
| CA | 2400673 | 8/2001 |
| CA | 2429889 | 6/2002 |
| CA | 2431466 | 6/2002 |
| CA | 2433448 | 7/2002 |
| CA | 2189631 | 11/2002 |
| CA | 2454812 | 2/2003 |
| CA | 2468885 | 7/2003 |
| CA | 2471179 | 7/2003 |
| CA | 2484134 | 11/2003 |
| CA | 2467288 | 11/2004 |
| CA | 2548225 | 11/2004 |
| CA | 2385775 | 5/2005 |
| CA | 2556613 | 8/2005 |
| CA | 2572190 | 1/2006 |
| CA | 2597440 | 8/2006 |
| CA | 2521817 | 3/2007 |
| CA | 2624612 | 4/2007 |
| CA | 2629167 | 5/2007 |
| CA | 2639796 | 6/2007 |
| CA | 2636379 | 7/2007 |
| CA | 2641919 | 8/2007 |
| CA | 2608973 | 1/2008 |
| CA | 2610918 | 2/2008 |
| CA | 2659449 | 2/2008 |
| CA | 2684696 | 11/2008 |
| CA | 2685369 | 11/2008 |
| CA | 2711013 | 11/2008 |
| CA | 2697789 | 3/2009 |
| CA | 2725391 | 11/2009 |
| CA | 2678724 | 3/2010 |
| CA | 2745572 | 7/2010 |
| CA | 2747370 | 7/2010 |
| CA | 2667029 | 11/2010 |
| CA | 2667033 | 11/2010 |
| CA | 2678276 | 3/2011 |
| CA | 2773571 | 3/2011 |
| CA | 2788965 | 8/2011 |
| CA | 2797561 | 11/2011 |
| CN | 101792185 | 8/2010 |
| EP | 157503 | 10/1985 |
| EP | 0054976 | 7/1986 |
| EP | 0238185 | 9/1987 |
| EP | 0327234 | 8/1989 |
| EP | 508676 | 10/1992 |
| EP | 466338 | 12/1995 |
| EP | 07755753 | 5/1997 |
| EP | 0829454 | 3/1998 |
| EP | 0692035 | 4/1998 |
| EP | 0834584 | 4/1998 |
| EP | 999185 | 5/2000 |
| EP | 1496063 | 1/2005 |
| EP | 2241649 | 10/2010 |
| EP | 2298944 | 3/2011 |
| GB | 195295 | 3/1923 |
| GB | 230916 | 3/1925 |
| GB | 240834 | 5/1926 |
| GB | 241184 | 5/1926 |
| GB | 273999 | 7/1927 |
| GB | 409710 | 5/1934 |
| GB | 470305 | 8/1937 |
| GB | 480921 | 3/1938 |
| GB | 490099 | 8/1938 |
| GB | 857245 | 12/1960 |
| GB | 858026 | 1/1961 |
| GB | 1056488 | 1/1967 |
| GB | 1307319 | 2/1973 |
| GB | 2013164 | 8/1979 |
| JP | 6056429 | 3/1994 |
| WO | 8603521 | 6/1986 |
| WO | 9103424 | 3/1991 |
| WO | 9213637 | 8/1992 |
| WO | 9600698 | 1/1996 |
| WO | 0104366 | 1/2001 |
| WO | 2004056468 | 7/2004 |
| WO | 2004056471 | 7/2004 |

(56) References Cited

FOREIGN PATENT DOCUMENTS

| WO | 2005123591 | 12/2005 |
|---|---|---|
| WO | 2006084682 | 8/2006 |
| WO | 2007074207 | 7/2007 |
| WO | 2007079532 | 7/2007 |
| WO | 2008067594 | 6/2008 |
| WO | 2008104250 | 9/2008 |
| WO | 2008141423 | 11/2008 |
| WO | 2008154995 | 12/2008 |
| WO | 2009153321 | 12/2009 |
| WO | 2010009512 | 1/2010 |
| WO | 2010056742 | 5/2010 |
| WO | 2010079369 | 7/2010 |
| WO | 2010133284 | 11/2010 |
| WO | 2011094858 | 8/2011 |
| WO | 2011100820 | 8/2011 |
| WO | 2011147867 | 12/2011 |
| WO | 2012126092 | 9/2012 |
| WO | 2012149642 | 11/2012 |
| WO | 2013037054 | 3/2013 |

OTHER PUBLICATIONS

An English translation of Zhang et al., "Research of the Controlling Steps of the Reaction of Kaolin and Hydrochloric Acid", Journal of Hefei University of Technology, vol. 21, No. 1, Feb. 1998, pp. 50-53.
An English translation of Zhang et al., "Kinetics Research on Alumina in Kaolinite Leached by Hydrochloric Acid", Journal of Hefei University of Technology, vol. 22, No. 2, Apr. 1999, pp. 33-36.
Certification of translation from Park IP Translations dated May 14, 2012.
An English Abstract of CN101450811 "Method for extracting alumina from coal gangue", published on Jun. 10, 2009.
An English Abstract of JP2001162108 "Method for Manufacturing Iron-Aluminum Combined Flocculant", published on Jun. 19, 2001.
Tceisele, "Primary Metal Production", Dec. 3, 2007.
US EPA, "Alumina & Aluminum", Office of Resource Conservation and Recovery, Apr. 2, 2012.
Wahab et al., "Alumina Recovery From Iraqi Kaolinitic Clay by Hydrochloric Acid Route", Iraqi Bulletin of Geology and Mining, vol. 2, No. 1, 2006, pp. 67-76.
An English Abstract of CA1065068 "Method of Selectively Precipitating Metals From Solutions", published on Oct. 23, 1979.
English Translation of Abstract of CN101289705, "Process for abstracting vanadium from iron-smeltin waste slag of vanadium-containing iron ore", Jul. 14, 2010.
English Translation of Abstract of CN102220487, "Method for extracting vanadium and aluminum from vanadium-containing stone coal and clay vanadium ore", Oct. 19, 2011.
English Translation of Abstract of CN102241410, "Ecological and Comprehensive Utilization Method of Coal Ash", Nov. 16, 2011.
English Translation of Abstract of RU2363748, "Method of Producing Aluminium", Aug. 10, 2009.
English Translation of Abstract of ES2194586, "Separation procedure for contaminatory metals present in acid solutions involves liquid-liquid extraction with mixtures based on phosphonated dialkyl alkyl, trialkyl phosphates and acid phosphates", Mar. 1, 2005.
English Translation of Abstract of WO2009005115, "Composition for promotion of reduction in size of adipocyte", Jan. 8, 2009.
Cohen et al., "Precipitation of iron from concentrated chloride solutions: Literature observations, challenges and preliminary experimental results", Minerals Engineering 18 (2005), pp. 1344-1347.
Elmolla et al., "Effect of Photo-Fenton Operating Conditions on the Performance of Photo-Fenton-SBR Process for Recalcitrant Wastewater Treatment", Journal of Applied Sciences 10 (24): 3236-3242, 2010.
Gunnar et al., Abstract of "Extraction of iron compounds from wood from the Vasa", Department of Chemistry, Swedish University of Agricultural Sciences, vol. 60, No. 6, pp. 678-684, 2006.
English Translation of Abstract of CN101045538, "Method for preparing modified silicon oxide using coal series kaolin rock or flyash", Oct. 3, 2007.
English Translation of Abstract of CN101249965, "Method for preparing ultra-fine white carbon black and nano alumina by using kaolinite as raw material", Aug. 27, 2008.
English Translation of Abstract of CN101045543, "Method for preparing sheet alumina using coal series kaolin rock or flyash as raw material", Oct. 3, 2007.
English Translation of Abstract of CN101434484, "Processes for producing alumina ceramic valve body and use thereof", May 20, 2009.
English Translation of Abstract of CN101462757, "Preparation of nano Na-beat-alumina powder", Jun. 24, 2009.
Cablik, "Characterization and applications of red mud from bauxite processing", VSB—Technical University of Ostrava, Faculty of Mining and Geology, pp. 27-37, 2007.
An English Abstract of JP57145027 "Preparation of Granular Alumina", published on Sep. 7, 1982.
Abstract of Dash et al., "Acid dissolution of alumina from waste aluminium dross", Hydrometallurgy, vol. 92, issues 1-2, May 2008, pp. 48-53.
Khan et al., "Production of Aluminum Sulphate from Indigenous Bauxite without Precalcination of the Ore", Jour. Chem Soc. Pak., vol. 17, No. 4, pp. 213-216, 1995.
Sahoo et al., "Characterization of $\gamma$- and $\alpha$-Fe2O3 nano powders synthesized by emulsion precipitation-calcination route and rheological behavior of $\alpha$-Fe2O3", International Journal of Engineering, Science and Technology, vol. 2, No. 8, pp. 118-126, 2010.
Bharathi et al., "Highly mesoporous $\alpha$-Fe2O3 nanostructures: preparation, characterization and improved photocatalytic performance towards Rhodamine B (RhB)", J. Phys. D: Appl. Phys. 43 015501, pp. 1-9, 2010.
"Industrial Inorganic Pigments", Wiley—VCH Verlag GmbH and Co. KgaA, pp. 105-112, 1993.
Andrieux et al., Abstract of: "Hydrothermal synthesis of dioctahedral smectites: The Al-Fe3+ chemical series: Part I: Influence of experimental conditions", Universite de Poitiers, 2009.
Bazin et al., "Alumina from clays", Department of Mining, Metallurgical and Materials Engineering; Alcan International Limitee; Groupe Conseil PROCD Inc.; Conseil de Developpement economique de Murdochville, pp. 24-38, 2005.
Aleksandrovich, "The receipt of alumina from clay materials", 2011.
Copson et al., "Extraction of Alumina from Clays by the Lime-sinter Modification of the Pedersen Process", New York Meeting, Feb. 1944, pp. 241-254.
Al-Zahrani et al., "Extraction of Alumina from Local Clays by Hydrochloric Acid Process", JKAU: Eng. Sci., vol. 20, No. 2, pp. 29-41, 2009.
Dutrizac et al., "The Precipitation of Hematite from Ferric Chloride Media at Atmospheric Pressure", Mining and Mineral Sciences Laboratories, vol. 30B, Dec. 1999, pp. 993-1001.
Riveros et al., "The precipitation of hematite from ferric chloride media", Mining and Mineral Sciences Laboratories, Hydrometallurgy 46 (1997), pp. 85-104.
Smirnov, V., "Alumina production in Russia Part I: Historical background", Journal of Materials, vol. 48, Issue 8, 1996, pp. 24-26.
Wei, X. et al., "Recovery of Iron and Aluminium from Acid Mine Drainage by selective precipitation", Environmental Engineering Science, vol. 22, No. 6, 2005, pp. 745-755.
English Abstract of WO 2007122720, published on Nov. 1, 2007.
English Abstract of WO 2004085719, published on Oct. 7, 2004.
English Abstract of SU 1 734 395, published on Oct. 27, 1996.
English Abstract of RU2416655, published on Apr. 20, 2011.
English Abstract of RU2008113385, published on Oct. 20, 2009.
English Abstract of RU2361941, published on Jul. 20, 2009.
English Abstract of RU2257348, published on Jul. 27, 2005.
English Abstract of RU2247788, published on Mar. 10, 2005.
English Abstract of RU2236375, published on Sep. 20, 2004.
English Abstract of RU2205242, published on May 27, 2003.
English Abstract of RU2201988, published on Apr. 10, 2003.
English Abstract of RU2196184, published on Jan. 10, 2003.
English Abstract of RU2189358, published on Sep. 20, 2002.
English Abstract of RU2176680, published on Dec. 10, 2001.
English Abstract of RU2162898, published on Feb. 10, 2001.
English Abstract of RU2162112, published on Jan. 20, 2001.

(56) References Cited

OTHER PUBLICATIONS

English Abstract of RU2158170, published on Oct. 27, 2000.
English Abstract of RU2147623, published on Apr. 20, 2000.
English Abstract of RU2147622, published on Apr. 20, 2000.
English Abstract of RU2140998, published on Nov. 10, 1999.
English Abstract of RU2119816, published on Oct. 10, 1998.
English Abstract of KR20070028987, published on Mar. 13, 2007.
English Abstract of JP9324227, published on Dec. 16, 1997.
English Abstract of JP9324192, published on Dec. 16, 1997.
English Abstract of JP9291320, published on Nov. 11, 1997.
English Abstract of JP9249672, published on Sep. 22, 1997.
English Abstract of JP9248463, published on Sep. 22, 1997.
English Abstract of JP9208222, published on Aug. 12, 1997.
English Abstract of JP9194211, published on Jul. 29, 1997.
English Abstract of JP9176756, published on Jul. 8, 1997.
English Abstract of JP9143589, published on Jun. 3, 1997.
English Abstract of JP8232026, published on Sep. 10, 1996.
English Abstract of JP5051208, published on Mar. 2, 1993.
English Abstract of JP4198017, published on Jul. 17, 1992.
English Abstract of JP4183832, published on Jun. 30, 1992.
English Abstract of JP4046660, published on Feb. 17, 1992.
English Abstract of JP3173725, published on Jul. 29, 1991.
English Abstract of JP2179835, published on Jul. 12, 1990.
English Abstract of JP2080530, published on Mar. 20, 1990.
English Abstract of JP2011116622, published on Jun. 16, 2011.
English Abstract of JP2011046588, published on Mar. 10, 2011.
English Abstract of JP2010270359, published on Dec. 2, 2010.
English Abstract of JP2008194684, published on Aug. 28, 2008.
English Abstract of JP2007327126, published on Dec. 20, 2007.
English Abstract of JP2007254822, published on Oct. 4, 2007.
English Abstract of JP2006348359, published on Dec. 28, 2006.
English Abstract of JP2006028187, published on Feb. 2, 2006.
English Abstract of JP2005139047, published on Jun. 2, 2005.
English Abstract of JP2000313928, published on Nov. 14, 2000.
English Abstract of JP10158629, published on Jun. 16, 1998.
English Abstract of JP10121164, published on May 12, 1998.
English Abstract of EP1817437, published on Aug. 15, 2007.
English Abstract of CN2292806, published on Sep. 30, 1998.
English Abstract of CN1986895, published on Jun. 27, 2007.
English Abstract of CN1796608, published on Jul. 5, 2006.
English Abstract of CN1699609, published on Nov. 23, 2005.
English Abstract of CN1410599, published on Apr. 16, 2003.
English Abstract of CN1397653, published on Feb. 19, 2003.
English Abstract of CN1192479, published on Sep. 9, 1998.
English Abstract of CN1478600, published on Mar. 3, 2004.
English Abstract of CN1140148, published on Jan. 15, 1997.
English Abstract of CN1127791, published on Jul. 31, 1996.
English Abstract of CN1131200, published on Sep. 18, 1996.
English Abstract of CN1061246, published on May 20, 1992.
English Abstract of CN1043752, published on Jul. 11, 1990.
English Abstract of CN102153128, published on Aug. 17, 2011.
English Abstract of CN102139943, published on Aug. 3, 2011.
English Abstract of CN102127641, published on Jul. 20, 2011.
English Abstract of CN102071317, published on May 25, 2011.
English Abstract of CN102071315, published on May 25, 2011.
English Abstract of CN102061392, published on May 18, 2011.
English Abstract of CN102030355, published on Apr. 27, 2011.
English Abstract of CN102021343, published on Apr. 20, 2011.
English Abstract of CN102011010, published on Apr. 13, 2011.
English Abstract of CN101824555, published on Sep. 8, 2010.
English Abstract of CN1045812, published on Oct. 3, 1990.
English Abstract of CN101407879, published on Apr. 15, 2009.
English Abstract of CN101307384, published on Nov. 19, 2008.
English Abstract of CN101161834, published on Apr. 16, 2008.
English Abstract of CN1844421, published on Oct. 11, 2006.
English Abstract of BE1019347 (A3), published on Jun. 5, 2012.
Ajemba et al., "Application of the Shrinking Core Model to the Analysis of Alumina Leaching From Ukpor Clay Using Nitric Acid", International Journal of Engineering Research & Technology (IJERT), ISSN: 2278-0181, vol. 1 Issue 3, May 2012.
Zhou et al., "Extraction of Scandium from red mud by modified activated carbon and kinetics study", Rare Metals, vol. 27, No. 3, Jun. 2008, pp. 223-227.
English Abstract of RU 2 183 225, published on Jun. 10, 2002.
Wang et al., "A novel recovery process of metal values from the cathode active materials of the lithium-ion secondary batteries", Hydrometallurgy 99 (2009) 194-201.
English Abstract of CN101781719, published on Jul. 21, 2010.
English Abstract of JP2009249674, published on Oct. 29, 2009.
Abstract of Kao et al., "Solvent extraction of La(III) and Nd(III) from nitrate solutions with 2-ethylhexylphosphonic acid mono-2-ethylhexyl ester", Chemical Engineering Journal, vol. 119, Issues 2-3, Jun. 15, 2006, pp. 167-174.
Yatsenko et al., "Red Mud Pulp Carbonization with Scandium Extraction during alumina Production", ISSN 0040-5795, Theoretical Foundations of Chemical Engineering, 2010, vol. 44, No. 4, pp. 563-568.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—Original French Version, Oct. 2004.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—English Translation, Oct. 2004.
Translator Certification—Sep. 10, 2012.
English Translation of CN102452677, published on May 16, 2012.
English Abstract of CN102719674, "Method for extracting rare earth from oxidized neodymium iron boron waste", published on Oct. 10, 2012.
English Abstract of CN102694218, "Solvent extraction method of aluminum", published on Sep. 26, 2012.
English Abstract of CN102690954, "Back extraction and removement method for aluminium", published on Sep. 26, 2012.
English Abstract of CN102680423, "Method for fast detecting aluminum content", published on Sep. 19, 2012.
English Abstract of CN102643985, "Method for extracting valuable metals from high-iron bauxite with step-by-step acid leaching", published on Aug. 8, 2012.
English Abstract of CN102628105, "Method for comprehensively recycling and using baric waste slag in refined aluminum production process", published on Aug. 8, 2012.

\* cited by examiner

PROCESSES FOR EXTRACTING ALUMINUM FROM ALUMINOUS ORES

CROSS-REFERENCE TO RELATED APPLICATIONS

The present application is a continuation of U.S. application Ser. No. 13/471,901 filed on May 15, 2012, that is continuation of U.S. application Ser. No. 12/900,371 filed on Oct. 7, 2010 (granted as U.S. Pat. No. 8,241,594 on Aug. 14, 2012), that is a continuation of U.S. application Ser. No. 12/601,079 filed on Nov. 20, 2009 (granted as U.S. Pat. No. 7,837,961 on Nov. 23, 2010) which is a 35 USC 371 national stage entry of PCT/CA2008/000877 filed on May 7, 2008 which claims priority from U.S. provisional application No. 60/939,254 filed on May 21, 2007. These documents are hereby incorporated by reference in their entirety.

TECHNICAL FIELD

The present invention relates to improvements in the field of chemistry applied to extraction of aluminum from aluminous ores. For example, such processes are useful for extracting aluminum from aluminous ores comprising various types of metals such as Fe, K, Mg, Na, Ca, Mn, Ba, Zn, Li, Sr, V, Ni, Cr, Pb, Cu, Co, Sb, As, B, Sn, Be, Mo, or mixtures thereof.

BACKGROUND OF THE INVENTION

More than 96% of the alumina which is produced worldwide is obtained from bauxite, which is a mineral that is particularly rich in alumina (40-60%) and whose main suppliers are from Jamaica, Australia, Brazil, Africa and Russia. In certain areas of the world there are large quantities of aluminous ores, which are aluminosilicates (for example argillite, nepheline, etc.) that are relatively rich in alumina (20-28%). However such areas have received little attention up to now because the production costs for extracting aluminum from such ores remained too high. In these aluminous materials, and contrary to bauxite, aluminum oxide is associated with silicated or sulfated phases. Thus, the Bayer process cannot be used, which means that alternative treatments for the production of alumina must be used or developed. Various processes have been proposed so far in order to extract aluminum from such aluminous ores comprising aluminosilicates but there is still room for improvement or for alternative routes.

SUMMARY OF THE INVENTION

According to one aspect, there is provided a process for extracting aluminum ions from a mixture comprising iron ions and the aluminum ions. The process comprises recovering the aluminum ions from a composition comprising the aluminum ions, the iron ions, an organic solvent and an extracting agent adapted to form an organometallic complex substantially selectively with the iron ions or with the aluminum ions which is soluble in the organic solvent.

According to one embodiment, the composition can comprise an acidic aqueous phase comprising aluminum ions and an organic phase comprising iron ions complexed with the extracting agent and wherein the aluminum ions are recovered by separating the aqueous phase from the organic phase. The aqueous phase can have a pH of about 1 to about 2.5 or of about 2. The extracting agent can be chosen from phosphoric acids and derivatives thereof, and phosphinic acids and derivatives thereof. For example, the extracting agent can be chosen from di-2-ethylhexyl phosphoric acid (HDEHP), bis (2,4,4-trimethylpentyl) phosphinic acid and 2-ethylhexyl phosphonic acid mono-2-ethylhexyl ester. The extracting agent can have a concentration of about 0.5 M to about 1.5 M in the organic phase or of about 1 M in the organic phase. The composition can have a volumic ratio organic phase:aqueous phase of about 1:1. After extraction (passing the composition through the membrane), the aqueous phase can be separated from the organic phase, and the aluminum ions can recovered in the aqueous phase and the aqueous phase can be treated with a base (for example NaOH, KOH, or a mixture thereof). The aqueous phase can be treated with the base so as to obtain a pH of at least about 4. The process can further comprise treating the organic phase with HCl and isolating the iron ions in the form of $Fe^{3+}$.

According to another embodiment, the composition can comprise an acidic aqueous phase comprising iron ions and an organic phase comprising aluminum ions complexed with the extracting agent, and wherein the aluminum ions are recovered by separating the aqueous phase from the organic phase. The aqueous phase can have a pH of about 2.5 to about 3.5. The extracting agent can be a phosphinic acid or a derivative thereof. For example, the extracting agent can be bis(2, 4,4-trimethylpentyl) phosphinic acid. The extracting agent can have a concentration of about 10% to about 25% v/v with respect to the organic solvent or of about 20% v/v with respect to the organic solvent. The composition can have a volumic ratio aqueous phase:organic phase of about 1:1 to about 1:3. During the process, the composition can be at a temperature of about 30° C. to about 50° C. or at a temperature of about 35° C. to about 45° C. After extraction through the membrane, the aqueous phase can be separated from the organic phase. The complexed aluminum ions can be recovered in the organic phase. The organic phase can then be treated with HCl so as to obtain an aqueous composition comprising the aluminum ions.

For example, the organic solvent can be chosen from hydrocarbons. For example, the organic solvent can be chosen from $C_5$-$C_{12}$ alkanes and mixtures thereof. The organic solvent can also be hexane or heptane. The organic phase and the aqueous phase can be separated by means of a filtration membrane, for example a hollow fiber membrane. Such membrane can comprise polypropylene, polyvinylidene difluoride, or a mixture thereof. The aqueous phase can be treated with the base so as to obtain a pH of at least about 4. The process can also further comprise a separation by filtration so as to obtain $Al(OH)_3$. The process can also comprise washing the $Al(OH)_3$. The process can also comprise converting $Al(OH)_3$ into $Al_2O_3$. Conversion of $Al(OH)_3$ into $Al_2O_3$ can be carried out at a temperature of about 800° C. to about 1200° C.

According to another aspect there is provided a composition comprising aluminum ions, iron ions, an organic solvent and an extracting agent adapted to form an organometallic complex substantially selectively with the iron ions or with the aluminum ions which is soluble in the organic solvent.

According to another aspect, there is provided a composition comprising an acidic aqueous phase comprising aluminum ions and an organic phase comprising iron ions complexed with an extracting agent.

According to another aspect, there is provided a composition comprising an acidic aqueous phase comprising iron ions and an organic phase comprising aluminum ions complexed with an extracting agent.

The various parameters, embodiments and examples previously described concerning the processes can also be applied, when possible, to these compositions.

According to another aspect, there is provided a process for at least partially separating aluminum ions from iron ions comprised in a composition, the process comprising substantially selectively precipitating at least a portion of the iron ions in basic conditions in which the pH is of at least 10. The iron ions can be precipitated from a basic aqueous composition comprising NaOH or KOH. For example, the base can be reacted with the composition to obtain a mixture in which the pH is of at least 10, and then, the at least portion of precipitated iron ions can be separated from the rest of the mixture. For example, the precipitated iron ions can be separated from the rest of the mixture by carrying out a filtration, a decantation, a centrifugation, or combinations thereof. The process can further comprise rinsing the obtained precipitated iron ions with a basic solution. The basic solution can have a concentration of about 0.01 M to about 0.02 M. The pH can be at least 11, at least 12, about 10.8 to about 11.2, about 11.8 to about 12.0, between 10 and 11, between 10.5 and 11.0 or about 11.5 to about 12.5. The process can further comprise purifying the precipitated iron ions by means of a hollow fiber membrane.

According to another aspect, there is provided a process for extracting aluminum from an aluminum ore, the process comprising:
leaching the aluminum ore with an acid so as to obtain a leachate and a solid residue;
removing at least a portion of iron ions contained in the leachate by:
(i) substantially selectively precipitating the at least portion of the iron ions in basic conditions in which the pH is of at least 10, so as to obtain an aluminum enriched composition; or
(ii) substantially selectively complexing the at least portion of the iron ions with an extracting agent adapted to form an organometallic complex substantially selectively with the iron ions so as to obtain an aluminum enriched composition.

For example, the acid can be HCl. The aluminum ore can leached with HCl at a temperature of at least 80° C., at least 90° C., or about 100° C. to about 110° C. HCl can have a concentration of about 6 M. The aluminum ore/acid ratio can be about 1/10 in weight by volume.

For example, the removal of the at least portion of iron ions can be carried out by precipitating the iron ions from a basic aqueous composition. The composition can comprise comprising NaOH or KOH.

For example, the removal of the at least portion of iron ions can be carried out by reacting the leachate with a base in order to obtain a pH of at least 10 and precipitating the iron ions.

For example, the precipitated iron ions can be separated from the rest of the leachate by carrying out a filtration, a decantation, a centrifugation, or mixtures thereof.

The process can further comprise rinsing the obtained precipitated iron ions with a basic solution. The basic solution can have a concentration of about 0.01 M to about 0.02 M. The pH can be at least 11, at least 12, about 10.8 to about 11.2, or about 11.5 to about 12.5. The process can further comprise purifying the precipitated iron ions by means of a hollow fiber membrane.

The removal of the at least portion of iron ions can be carried out by reacting the leachate, under acidic conditions, with the extracting agent and an organic solvent in order to obtain a composition comprising an acidic aqueous phase comprising aluminum ions and an organic phase comprising iron ions complexed with the extracting agent. The aluminum enriched composition can be obtained by separating the aqueous phase from the organic phase. The aqueous phase can have a pH of about 1 to about 2.5, or about 2. The extracting agent can be chosen from di-2-ethylhexyl phosphoric acid (HDEHP), bis(2,4,4-trimethylpentyl) phosphinic acid and 2-ethylhexyl phosphonic acid mono-2-ethylhexyl ester). The extracting agent can have a concentration of about 0.5 M to about 1.5 M in the organic phase or about 1 M in the organic phase.

For example, the organic solvent can be chosen from $C_5$-$C_{12}$ alkanes and mixtures thereof. The organic solvent can be heptane. The composition can have a volumic ratio organic phase:aqueous phase of about 1:1. The organic phase and the aqueous phase can be separated by means of a filtration membrane. The membrane can be a hollow fiber membrane. The membrane can comprise polypropylene, polyvinylidene difluoride, or a mixture thereof.

After passing the composition through the membrane, the aqueous phase can separated from the organic phase. The aluminum ions can be recovered in the aqueous phase and the aqueous phase is treated with a base (such as NaOH or KOH). The aqueous phase can be treated with the base so as to obtain a pH of at least about 4. The process can further comprise a separation by filtration to obtain Al(OH)$_3$, which can be eventually washed.

For example, the aluminum ore can be crushed and roasted before being leached.

For example, before removal of the iron ions, the leachate is treated with a base.

For example, before removal of the iron ions, the leachate can be distilled so as to reduce its volume.

For example, the process can further comprise at least partially recovering the aluminum ions present in the aluminum enriched composition.

For example, the aluminum enriched composition can be treated with an extracting agent adapted to form an organometallic complex substantially selectively with the aluminum ions in the presence of an organic solvent and an acid solution in order to form a composition comprising an acidic aqueous phase comprising impurities and an organic phase comprising aluminum ions complexed with the extracting agent. The aluminum ions can be recovered by separating the aqueous phase from the organic phase. For example, the aqueous phase can have a pH of about 2.5 to about 3.5. The extracting agent can be a phosphinic acid or a derivative thereof. The extracting agent can be bis(2,4,4-trimethylpentyl) phosphinic acid. The extracting agent can have a concentration of about 10% to about 25% v/v or about 20% v/v with respect to the organic solvent. The organic solvent can be chosen from $C_5$-$C_{12}$ alkanes and mixtures thereof. The organic solvent can be heptane. The composition can have a volumic ratio aqueous phase:organic phase of about 1:1 to about 1:3. The organic phase and the aqueous phase can be separated by means of a membrane (for example a hollow fiber membrane). The membrane can comprise polypropylene, polyvinylidene difluoride, or a mixture thereof. The composition can be at a temperature of about 30° C. to about 50° C., or about 35° C. to about 45° C. After passing the composition through the membrane, the aqueous phase can be separated from the organic phase. The complexed aluminum ions can be recovered in the organic phase. The organic phase can then be treated with HCl so as to obtain an aqueous composition comprising the aluminum ions. The aluminum ions can be converted into Al(OH)$_3$ by contacting it with a base. Al(OH)$_3$ can then be converted into Al$_2$O$_3$. Such a conversion of Al(OH)$_3$ into Al$_2$O$_3$ can be carried out at a temperature of about 800° C. to about 1200° C.

BRIEF DESCRIPTION OF DRAWINGS

In the following drawings, which represent by way of example only, various embodiments of the invention.

DETAILED DESCRIPTION OF VARIOUS EMBODIMENTS

Figure 1:
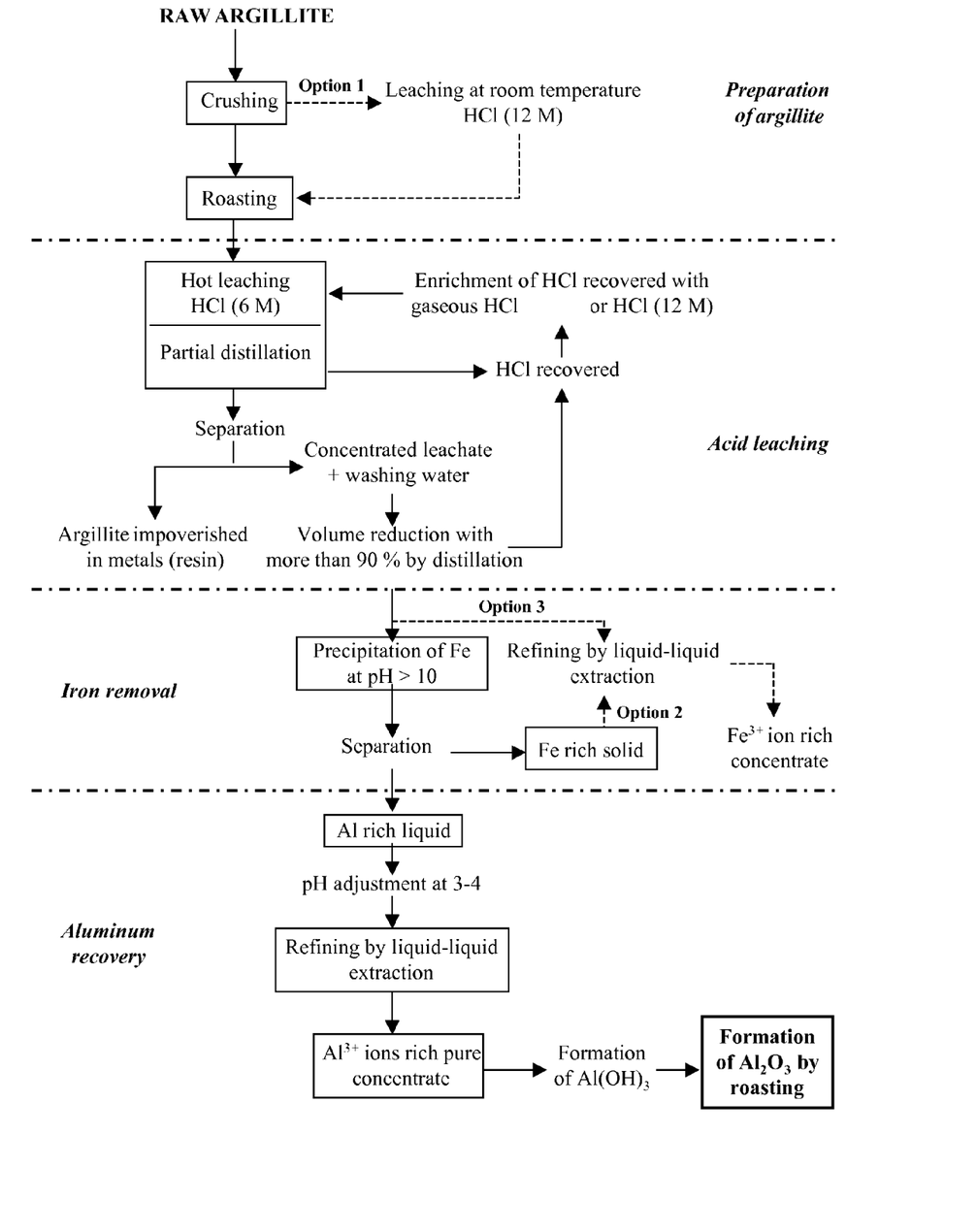
FIG. 1 shows a bloc diagram of a process according to one embodiment of a process for extracting aluminum from an aluminous ore.

Further features and advantages will become more readily apparent from the following description of various embodiments as illustrated by way of examples only in the appended drawings wherein:

As it can be seen from FIG. 1, such a process can comprise various steps, and each of these steps can eventually be individually considered has being a process.

Preparation of Argillite Sample

Argillite can be finely crushed in order to help along during the following steps. For example, micronization can shorten the reaction time by few hours (about 2 to 3 hours). In order to remove most of the iron, a leaching step at room temperature is optionally carried out between the crushing step and the roasting step (see option 1). This operation is, for example, carried out with hydrochloric acid HCl (12 M) and an argillite/acid ratio (weight/volume) of 1:5 is used. Depending on experimental conditions (sizes of the particles, time of treatment, agitation system), about 65% to about 93% of the iron can then be removed. However, this leaching step can also bring in a certain percentage of the aluminum (0-5%). The last step of the preparation of argillite comprises roasting the pretreated argillite. This can be accomplished at a temperature greater than 550° C. for a period of about 1 to 2 hours. For example, a heat treatment makes it possible to increase the quantity of extracted aluminum by about 30% to about 40% for the same period of time. In others words, the quantity of extracted aluminum is doubled. When leaching at room temperature is carried out, a phase separation before roasting can be made in order to recover the acid and reduce heating costs.

Acid Leaching

Acid leaching comprises reacting the crushed and roasted argillite with a hydrochloric acid solution at elevated temperature during a given period of time. For example, the argillite/acid ratio can be of about of 1:10 (weight/volume), the HCl concentration can be of about 6 M, the temperature can be of about 100° C. to about 110° C., and the reaction time can be of about 5 to about 7 hours. Under such conditions, more than about 90% of the aluminum and about 100% of the iron can be extracted in addition to impurities.

During the second half of such a treatment (for example the last 2 or 3 hours), a portion of the acid can be recovered by condensation. Once the extraction is terminated, the solid (argillite impoverished in metals) can be separated from the liquid by decantation or by filtration, after which it is washed. The residual leachate and the washing water may be completely evaporated. The corresponding residue can thereafter be washed many times with water so as to decrease acidity and to lower the quantities of sodium hydroxide (NaOH) that are required to adjust the pH during iron removal. Final volume accounts for 10% to 20% of initial volume. The acid recovered will can be re-utilized after having adjusted its titer either by adding gaseous HCl, or by adding concentrated HCl (12 M). After the reaction, the titer of the acid can vary from about 4 M to about 6 M depending on experimental conditions. With respect to the solid, it represents about 65% to about 75% of the initial mass of argillite, it can be valorized and be used again either as an ion exchange resin, or as an adsorbent.

Removal of Iron

Removal of iron can be carried out by precipitation of the latter in basic medium for example at a pH of at least 10 or at a pH of about 11.5 to about 12.5. Such a step can be made by adding NaOH, for example at a concentration of 10 M. Other bases such as KOH can also be used. Then, all that is required is to separate the solid portion from the liquid portion by filtration, decantation or centrifugation and to rinse the solid by means of a diluted base, such as a solution of NaOH (for example NaOH at a concentration of 0.01 M to 0.02 M). Then, the solid is washed with distilled water. The liquid portion comprises aluminum and alkaline-earths A substantially complete removal of the iron and of nearly all the impurities (other metals) can thus be achieved. Optionally, it is possible to recover iron by using a refining step by liquid-liquid extraction through a hollow fiber membrane (see option 2).

Alternatively (see option 3), removal of iron can be carried out by using an extracting agent and a hollow fiber membrane. Various extracting agents that could substantially selectively complex iron ions over aluminum ions (or aluminum ions over iron ions) could be used in such a step depending an Al/Fe ratio. For example, extraction can be carried out by using HDEHP (diethylhexylphosphoric acid) as an extracting agent adapted to complex iron ions. A concentration of about 1 M of HDEHP can be used in an organic solvent, such as heptane or any hydrocarbon solvent. Such an extraction can require relatively short contact times (few minutes). For example, the pH of the order of 2 can be used and aqueous phase/organic phase ratio can be of about 1:1. It was observed that is possible to extract from 86% to 98% iron under such conditions. It will be understood that in the present case, iron is trapped in the organic phase. To recover iron in an aqueous phase, a reverse extraction with hydrochloric acid (2 M or 6 M) and organic phase/acidic phase ratio of about 1:0.5 can then be carried out. In such a case, the resulting aqueous phase is rich in $Fe^{3+}$ ions.

Aluminum Recovery

The solution obtained from the previous step using either the precipitation or the extraction technique is relatively clean and mainly contains aluminum for example about 90% to 95% (without the alkaline-earths in the case of precipitation). Recovery of the latter can be carried out by liquid-liquid extraction for example by using a same hollow fiber membrane and an extracting agent that is adapted to complex at least substantially selectively aluminum over other metals or residues. For example, bis(2,4,4-trimethylpentyl) phosphinic acid (such as the one sold under the name Cyanex™ 272) can be used as an extracting agent specific to aluminum. For example, this extracting agent can be used at a concentration of about 20% v/v in an organic solvent such as heptane. The ratios between the aqueous phase and the organic phase can be of about 1:1 to about 1:3. For example, the extraction temperatures can be of about 40° C. and the pH can be maintained at about 2.5 to about 3.5. It was observed that such a technique makes it possible to extract more than 70-90% of the aluminum. After the aluminum has been trapped in the organic phase, it can be recovered in the form of a concentrate of $Al^{3+}$ ions by using a back extraction. For example, the reverse extraction can be carried out at a temperature of about 40° C. with hydrochloric acid (for example at a concentration of 6 M). Under this condition, more than 90% of aluminum can be recovered. Then, $Al^{3+}$ can be converted into aluminum hydroxide $Al(OH)_3$ by addition of NaOH. Finally, $Al(OH)_3$ can be converted into alumina (alumina $Al_2O_3$) by roasting $Al(OH)_3$ for example at a temperature of about 800° C. to 1200° C.

The following non-limiting examples further illustrate the invention.

EXAMPLES

Example 1

Preparation of Argillite Sample

Crushing of mudstone: The resulting micronization average employed for the tests ranges between 10 and 50 microns.

Roasting: Crushed mudstone was roasted at least during 1 hour at a temperature of 600° C. Its average composition was:

| | |
|---|---|
| $Al_2O_3$ | 21.0% |
| $Fe_2O_3$ | 8.0% |
| $K_2O$ | 1.5% |
| $Na_2O$ | 0.9% |
| $TiO_2$ | 0.9% |
| CaO | 0.08% |
| ZnO | 0.06% |
| $SiO_2$ | 51.0% |

Acid Leaching 500 g of argillite crushed and roasted were added to 5 liters of hydrochloric acid 6 M. The mixture was then heated at 100° C.-110° C. during 7 hours.

After reaction, the liquid part was separated from the solid part by filtration. The solid was washed with distilled water which was added to the liquid portion. This washing makes it possible to recover part of the aluminum trapped in the solid. This solid had a dry mass of 345±-5 g, which corresponds to a loss of about 30%-32%.

The remaining liquid part, containing aluminum, iron and a great part of the impurities initially present in mudstone, was reduced by evaporation at a temperature of 100° C. to 90% of its initial volume. Residual volume was then 50 mL. The liquid compositions before and after evaporation were:

| | Leaching solution Composition (%) [concentration (mg/L)] | Evaporated leaching solution Composition (%) [concentration (mg/L)] |
|---|---|---|
| Aluminum | 47.63 [9 250] | 47.86 [59 500] |
| Iron | 31.54 [6 125] | 31.07 [38 625] |
| Alkaline-earths (Na, Mg, K, Ca) | 19.30 [3 749] | 19.53 [24 277] |
| Other metals | 1.53 [297.3] | 1.54 [1 920] |

All the ions species seem to remain soluble.

Removal of Iron

The residual volume was slightly diluted (+25%) and concentrated hydroxide sodium (10 M) was added until a pH higher than 11.5 was reached. The formed precipitate was separated from the solution by standard filtration and was washed several times with NaOH diluted and hot ultra-pure water. The precipitate contained all the iron and the majority of the metal impurities. The filtrate contained in addition to ions $Al^{3+}$ mainly alkaline-earths and some following impurities:

| | Major filtrate impurities (%) |
|---|---|
| Iron | 0.14 |
| Sodium | 94.13 |
| Alkaline-earths (Mg, K, Ca) | 5.71 |
| Other metals | 0.02 |

Na+ came from soda and was also the $Al(OH)_4^-$ counter-ion.

Aluminum Recovery

The filtrate is adjusted at a pH of 2.5 to 3.5 by addition of HCl 6 M. The resulting solution is extracted by means of the complexing agent, Cyanex 272, at a concentration of 20% volume/volume in an organic solvent with a volumetric ratio of 1:1. The extraction is carried out at a temperature of 40° C. in a membrane contactor with hollow fibers. In less than about 30 to 60 min, more than 85% of aluminum is extracted. The pH adjustment is performed by a regulation loop controlling the NaOH (10 M) addition. Complexed $Al^{3+}$ in Cyanex are then recovered by carrying out a back extraction with HCl (6 M) at 40° C. and an organic phase/acid phase volumetric ratio of 1:0.5. After the back extraction, the composition of the recovered acid phase is:

| | Composition (%) |
|---|---|
| Aluminum | 92.81 |
| Iron | 0 |
| Alkaline-earths (Na, Mg, K, Ca) | 7.14 |
| Other metals | 0.05 |

To increase the percentage of purity, the $Al^{3+}$ ions are precipitated in the form of $Al(OH)_3$ hydroxide, then washed several times with ultra-pure water. The composition of the hydroxide becomes:

| | Composition (%) |
|---|---|
| Aluminum | 99.09 |
| Iron | 0 |
| Alkaline-earths (Na, Mg, K, Ca) | 0.88 |
| Other metals | 0.03 |

Further purification can be performed by recrystallization

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for preparing alumina, said process comprising:

leaching argillite with HCl to obtain a composition comprising a leachate and a solid residue;

separating said leachate and said solid residue from one another;

at least partially removing iron from said leachate by substantially selectively precipitating iron ions by reacting said leachate with a base and removing a so-formed precipitate, to obtain an Al-rich composition comprising $Al^{3+}$ ions;

purifying said $Al^{3+}$ ion; and converting said $Al^{3+}$ ions into alumina.

2. The process of claim 1, wherein said $Al^{3+}$ ions are purified by substantially selectively precipitating them.

3. The process of claim 2, wherein said $Al^{3+}$ ions are substantially selectively precipitated by reacting said Al-rich composition with a base.

4. The process of claim 2, wherein said $Al^{3+}$ ions are substantially selectively precipitated by reacting said Al-rich composition with an acid.

5. The process of claim 4, wherein said iron ions are at least partially removed said leachate by substantially selectively precipitating them at a pH of at least 10.

6. The process of claim 5, wherein said pH is between 10 and 11.

7. The process of claim 5, wherein said pH is at least 11.

8. The process of claim 5, wherein said pH is about 11.5 to about 12.5.

* * * * *